(12) United States Patent
Nance

(10) Patent No.: US 7,193,530 B2
(45) Date of Patent: Mar. 20, 2007

(54) AIRCRAFT LANDING GEAR AUTOMATED INSPECTION AND LIFE LIMITATION ESCALATION SYSTEM AND METHOD

(76) Inventor: C. Kirk Nance, 720 Whitley Rd., Keller, TX (US) 76248

( * ) Notice: Subject to any disclaimer, the term of this patent is extended or adjusted under 35 U.S.C. 154(b) by 172 days.

(21) Appl. No.: 11/092,020

(22) Filed: Mar. 29, 2005

(65) Prior Publication Data

US 2006/0220917 A1 Oct. 5, 2006

(51) Int. Cl.
*G08B 21/00* (2006.01)
(52) U.S. Cl. .............. 340/960; 244/100 R; 244/102 R; 244/104 FP; 73/178 T; 267/64.26
(58) Field of Classification Search ................ 340/960; 244/100 R, 102 R, 104 FP; 73/178 T; 267/64.26
See application file for complete search history.

(56) References Cited

U.S. PATENT DOCUMENTS

| 3,581,836 A | * | 6/1971 | Segerdahl et al. ..... 73/862.581 |
| 4,869,444 A | * | 9/1989 | Ralph .................... 244/104 FP |
| 5,214,586 A | | 5/1993 | Nance |
| 5,548,517 A | | 8/1996 | Nance |
| 6,032,090 A | * | 2/2000 | von Bose .................. 73/65.05 |
| 6,128,951 A | | 10/2000 | Nance |
| 6,237,406 B1 | | 5/2001 | Nance |
| 6,237,407 B1 | | 5/2001 | Nance |
| 6,293,141 B1 | * | 9/2001 | Nance ...................... 73/178 T |
| 2006/0144997 A1 | * | 7/2006 | Schmidt et al. ............. 340/960 |

* cited by examiner

*Primary Examiner*—Jeffery Hofsass
*Assistant Examiner*—Samuel J. Walk
(74) *Attorney, Agent, or Firm*—Geoffrey A. Mantooth

(57) ABSTRACT

A system for use in monitoring, measuring, computing and displaying the landing loads experienced while aircraft are executing either normal, overweight or hard landing events. Pressure sensors and motion sensors are mounted in relation to each of the landing gear struts to monitor, measure and record the impact loads and aircraft sink rates; experienced by landing gear struts, as the aircraft landing gear initially come into contact with the ground. The computer of this system measures the landing loads experienced by each landing gear strut and determines if a hard landing event has occurred. Additional features include automating the inspections required to aircraft components, after overweight or hard landing events.

15 Claims, 13 Drawing Sheets

AIRCRAFT LANDING GEAR AUTOMATED INSPECTION AND LIFE LIMITATION ESCALATION SYSTEM AND METHOD

BACKGROUND OF THE INVENTION

There are many critical factors the pilot of an aircraft must consider, when determining both the take-off and landing weights of the aircraft, before departure. Aircraft manufacturers determine, certify and publish maximum gross take-off and landing weight limitations of the aircraft. This is done to insure that at take-off speed, the wings are generating sufficient lift to lift the weight of the airplane. Aircraft manufacturers also have restrictions regarding the maximum allowable weight the aircraft landing gear and other supporting structures can safely absorb, when the aircraft lands. These landing weight restrictions are often determined not by how much weight the landing gear can safely handle at any single landing, but more as to the fatigue life of the landing gear system, in relation to the life expectancy of the aircraft, as a whole. The aircraft manufacturer must consider the possibility that bad weather at the airport or poor landing skills of less experienced pilots might cause "hard landing events", which put much greater strain on the components and drastically shorten the anticipated fatigue life of the components. For instance, a heavily loaded aircraft making a smooth landing puts less strain on the aircraft and landing gear system, than a lightly loaded aircraft which lands either abruptly or asymmetrically, where one of the main landing gear makes ground contact first and must endure all of the force of the initial impact. Aircraft manufacturers which offer their airplanes through lease arrangements often find that after the initial lease period, it difficult to sell or re-lease the returned, mid-life aircraft, when the aircraft are returned with an expensive component such as the landing gear system, "run-out" to the absolute limits of its useful life. An aircraft manufacturer must determine inspection and/or life cycle limitations based on what the aircraft manufacturer estimates the wear and tear on the landing gear systems are, by any given operator. Manufacturers often limit the maximum landing weight of an aircraft, solely to balance the life cycle of the landing gear, to the life cycle of the aircraft as a whole.

Prior art to determine aircraft gross weight and center of gravity are well known and well documented. Reference may be made to U.S. Pat. No. 3,513,300 Elfenbein, and this inventor, U.S. Pat. No. 5,548,517 and U.S. Pat. No. 6,128,951 Nance.

U.S. Pat. No. 3,513,300 Elfenbein, identified the relationship between aircraft weight and the pressure within the landing gear struts. Elfenbein pioneered the art of measuring landing gear strut pressure and relating it to the amount of weight supported.

This invention relates to improvements to the prior art including the prior art of this inventor (Nance) U.S. Pat. No. 5,548,517 and U.S. Pat. No. 6,128,951. The prior Nance technology, among other things, measures strut pressure within each landing gear strut, as well as the pressure distortions caused by strut seal friction. The Nance prior art incorporates the storage of defined pressure limits to be used in the determination of hard landings by the aircraft. The hard landings are determined by recording maximum "spike pressure" measurements, recorded as the aircraft comes into initial contact with the ground. This new invention surpasses the technology of the prior art by using the stored hard landing data, as well as additional landing load data, accumulated with every aircraft landing event, to build an actual life history of the landing gear, to be used in comparison of the aircraft manufacturers' assumption of landing gear use or possible abuse; to develop the documentation necessary, with engineering review, to allow increases in the life limitation of the aircraft landing gear system. Furthermore, this extension in landing gear life can be exchanged or offset against an increase in the maximum landing weight of the aircraft. Such an increase in maximum landing weight translates into increased passenger loads.

SUMMARY OF THE INVENTION

It is one object of the present invention to provide improvements to this inventor's previous aircraft hard landing indicator (U.S. Pat. No. 5,548,517) as well as the monitoring of landing gear strut fluid levels (U.S. Pat. No. 6,128,951), which utilizes landing gear strut pressure measurements.

It is another object of the present invention to provide a means to better monitor the utilization of the aircraft landing gear system as compared to the manufacturer's life cycle limitations.

It is another object of the present invention to provide a tool to automatically inspect landing gear components during all landing events, including overweight landings.

It is another object of the present invention to provide a tool to compile a data history for each landing gear strut to be used to evaluate potential landing gear life or cycle escalations.

It is another object of the present invention, in an aide to better monitor the utilization of the aircraft landing gear system as compared to the manufacturer's life cycle limitations, to monitor the rate and amount of compression of each respective landing gear strut and/or angle change of trailing arm, during all landing events, including overweight landings.

It is another object of the present invention, to better monitor the utilization of the aircraft landing gear system as compared to the manufacturer's life cycle limitations, to monitor the sink rate of an aircraft, during all landing events, including overweight landings.

The present invention provides a method for monitoring a landing gear strut of an aircraft during a landing event. The landing gear strut is telescopic and comprises a compressible fluid. The telescopic rate of movement of the strut is determined during a landing event. It is determined if the strut has exceeded a predetermined strut rate of movement. If the strut has exceeded the predetermined rate of movement, then an indication thereof is provided.

In accordance with one aspect of the present invention, the step of determining the telescopic rate of movement of the strut during the landing event further comprises measuring an inclination of a linkage on the strut.

In accordance with another aspect of the present invention, the step of determining the telescopic rate, of movement of the strut during the landing event further comprises the step of compensating the inclination of the strut linkage for changes in the aircraft inclination.

In accordance with another aspect of the present invention, the step of determining the telescopic rate of movement of the strut during the landing event further comprises measuring an angle of a linkage on the strut.

In accordance with another aspect of the present invention, the fluid pressure of the strut is determined during the landing event. It is determined if the strut has exceeded a predetermined fluid pressure. If the strut has exceeded the predetermined fluid pressure and if the strut has exceeded the predetermined strut rate of movement, then an indication thereof is provided.

In accordance with another aspect of the present invention, if the strut has not exceeded the predetermined fluid pressure and has not exceeded the predetermined strut rate of movement, but the aircraft has exceeded a maximum landing weight, then continuing to operate the aircraft without manual inspection of the aircraft after the immediate landing event.

In accordance with still another aspect of the present invention, if the strut has not exceeded the predetermined rate of movement, but the aircraft has exceeded a maximum landing weight, then continuing to operate the aircraft without manual inspection of the aircraft after the immediate landing event.

The present invention also provides a method of monitoring a landing gear strut of an aircraft during a landing event, the landing gear strut being telescopic and comprising a compressible fluid, the strut having a maximum fluid pressure limit and an acceptable fluid pressure range. The acceptable fluid pressure range being lower than the maximum fluid pressure limit. The fluid pressure of the strut is determined through the landing event. It is determined if the strut fluid pressure, after the point the aircraft wings are no longer generating lift, has exceeded the maximum fluid pressure limit. If the determined strut fluid pressure has exceeded the maximum fluid pressure limit, then providing an indication thereof.

In accordance with another aspect of the present invention, if the determined strut fluid pressure has not exceeded the maximum fluid pressure limit, but the aircraft has exceeded a maximum landing weight, then continuing to operate the aircraft without manual inspection of the aircraft, after the immediate landing event.

In accordance with another aspect of the present invention, the step of determining the fluid pressure of the strut during the landing event further comprises the step of measuring strut pressure in a high pressure location of the strut.

In accordance with another aspect of the present invention, the step of determining the fluid pressure of the strut during the landing event further comprises the step of measuring strut pressure in a low pressure location of the strut and compensating for error due to the low pressure location.

The present invention also provides a method of operating an aircraft from a departure location to an arrival location. The aircraft having telescopic landing gear struts that comprise a compressible fluid. Each of struts having a maximum fluid pressure limit, the aircraft having a takeoff weight and planned landing weight. The planned landing weight being less than the takeoff weight by a weight of the fuel consumed by the aircraft during the flight. The aircraft having a certified maximum landing weight. At the departure location, the aircraft is loaded with payload and fuel. The fuel is a planned fuel which will be consumed on the flight from the departure location to the arrival location. The planned landing weight is equal to or less than the certified maximum landing weight. The aircraft is landed with some of the planned fuel onboard. Upon landing the aircraft, the strut load is measured. For each strut, determining if the strut load on landing has exceeded the maximum strut load limit. If, for each strut, the load has not exceeded the maximum strut load limit, then continuing to operate the aircraft without manual inspection of the aircraft, after the immediate landing event.

In accordance with one aspect of the present invention, the step of measuring strut load further comprises the step of determining the telescopic rate of movement of the strut during the landing event. The step of determining if the strut load on landing has exceeded the maximum strut load limit further comprises determining if the strut has exceeded a predetermined strut rate of movement limitation. If the strut has exceeded the predetermined strut rate of movement, then providing an indication thereof.

In accordance with another aspect of the present invention, the step of measuring strut load further comprises determining the fluid pressure of the strut during a landing event. The step of determining if the strut load on landing has exceeded the maximum strut load limit further comprises determining if the strut fluid pressure has exceeded a maximum fluid pressure limit. If the strut fluid pressure has exceeded the maximum fluid pressure limit, then providing an indication thereof.

A method of determining life limitations of a landing gear on an aircraft, the strut being telescopic and having a compressible fluid therein. Recording strut fluid pressures during landing events of the aircraft. Recording strut sink rates during landing events of the aircraft. Comparing the recorded fluid pressures to predicted maximum landing loads of the strut and comparing the recorded sink rates to predicted excessive sink rate of the strut. Using the comparison then determining the remaining useable life of the landing gear strut.

BRIEF DESCRIPTION OF THE DRAWINGS

Although the features of this invention, which are considered to be novel, are expressed in the appended claims; further details as to preferred practices and as to the further objects and features thereof may be most readily comprehended through reference to the following description when taken in connection with the accompanying drawings, wherein:

FIG. 10A illustrates an overweight landing event while FIG. 10B illustrates hard landing events.

DETAILED DESCRIPTION OF THE PREFERRED EMBODIMENT

Figure 1:
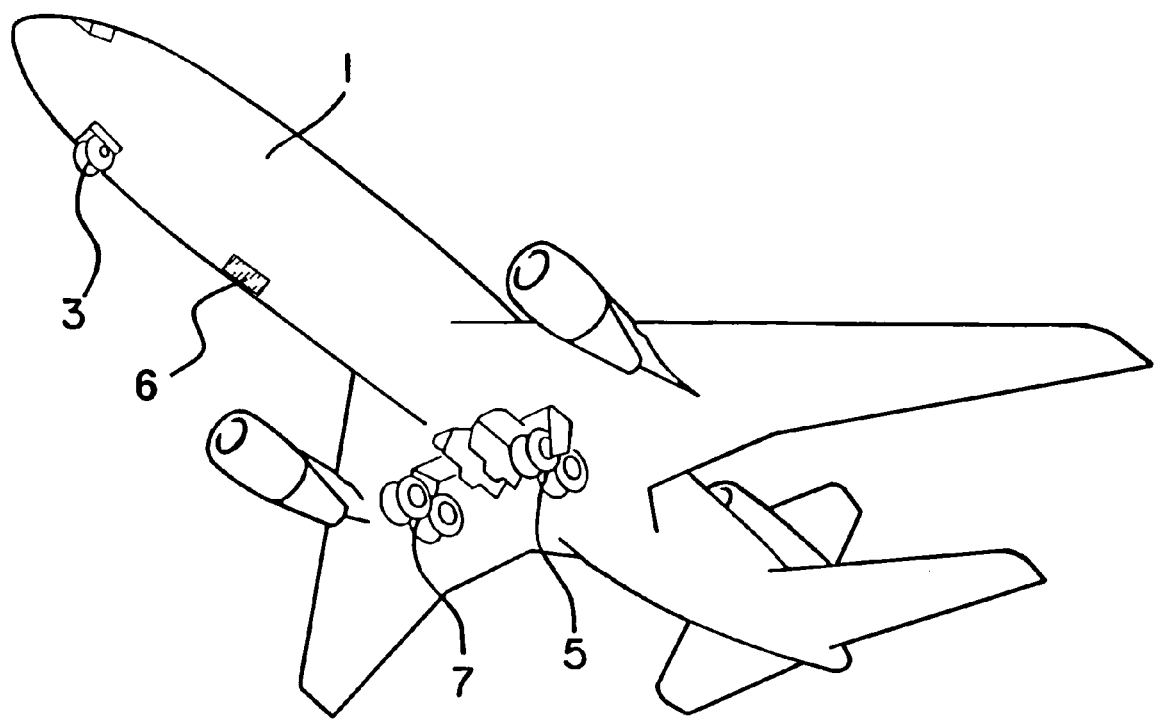
FIG. 1 is a view of the lower side of a typical commercial airliner with a tricycle type landing gear, in the extended position.

An aircraft is typically supported by plural pressurized landing gear struts. Each landing gear strut is designed much like, and incorporates many of the features of a typical shock absorber. The shock absorber of the landing gear strut comprises internal fluids, both hydraulic fluid and compressed nitrogen gas. The aircraft weight is transmitted into and/or identified by the pressures contained within the landing gear struts. Weight is directly proportional to pressure measured in "psi" (pounds per square inch). The landing gear is stressed, although less severely, when the aircraft accelerates for take-off and during taxiing operations. The landing gear experiences the most stress when the aircraft lands. The vertical deceleration of the aircraft, onto the airport runway, generates heavy stress on the landing gear. Though the weight of the aircraft may not be extraordinarily heavy, the rate of the aircraft's vertical deceleration can generate high pressures within the landing gear struts (far higher than the pressures related to the stationary aircraft at the same weight) sending damaging force through the landing gear, as well as attachment points of the landing gear to the airframe. Because the aircraft manufacturer does not have a representative riding on every aircraft departure and witnessing every landing event, the manufacturer must instead make assumptions as to the amount of force that will be transferred from the landing gear to the airframe, throughout the life of the aircraft and landing gear. Aircraft manufacturers are left with only one remedy, and that is to impose maximum landing weight limitations to the aircraft. Weight is the only parameter airlines can currently measure or estimate; therefore weight is the limiting factor the aircraft manufacture must use. Manufacturers consider the weight, and motion or velocity of that weight, in determining the loads applied to the landing gear components and attachment points to the aircraft. The aircraft manufacturer considers the time and/or number of landing events, in determining component Life Cycle Limitations for the aircraft. Life Cycle Limitations are determined by the aircraft and other component manufacturer, often based on assumptions of landing gear usage far in excess of what the landing gear actually experiences.

Current airline regulations require tracking and reporting of on-time arrival statistics; late arrivals reflect adversely on airline performance. Late arrivals commonly occur where a fully loaded aircraft has left the departure airport, only to find that the amount of planned fuel usage on a particular route is greater than actual fuel required. This can result from a tail-wind during the planned route of the aircraft, allowing the aircraft to burn less fuel. The fully loaded aircraft thus has excess fuel on board. The aircraft operator must then choose between delaying the scheduled arrival time by circling the arrival airport, allowing the excess fuel to be burned, or land the aircraft as scheduled with an overweight landing event. An overweight landing event is when an aircraft lands at a weight that is greater than the manufacturer's certified maximum landing weight. Overweight landing events are allowed but the overweight landings require costly and time-consuming manual inspections. When overweight landings occur, the aircraft manufacturer requires an inspection of the landing gear and the connections of the landing gear to the aircraft. This is a visual inspection done by trained aircraft mechanics. The aircraft is immediately pulled out of service. Thus, an overweight landing event can be costly to an airline.

The present invention can perform the required inspection, automatically by sensing aircraft landing loads, measured during each and every landing event. The method monitors the amount and rate of pressure changes to the fluids within each of the landing gear struts, along with the rate and amount of compression of each respective landing gear strut; so as to determine if an overweight landing has caused structural damage to the aircraft to the point an actual hard landing event has occurred. These pressure changes are caused by compression of the landing gear struts, during the landing of the aircraft. Compression of each of the landing gear struts is detected in two separate ways: 1) pressure increases are measured within the landing gear shock absorber and compared to the rate and amount of pressure increase; and 2) movement (be it telescopic or hinged movement) of the landing gear is compared to the rate and amount of movement. Upon detection of the compression of a respective landing gear strut, the step of monitoring the rate and amount of strut compression is used to determine aircraft sink rate, during landing. The pressure within each of the landing gear struts is determined during this same period of time. These pressure determinations along with aircraft sink rate determinations are the factors used to calculate the loads applied to the landing gear, and those same loads transferred through the landing gear to the airframe, at a specific landing event. Once these calculations have been made and recorded, they can then be compared to the manufactures life limitations and the "unused portion" or remaining number of the landing gear strut cycles can be determined.

Referring now to the drawings, wherein like reference numerals designate corresponding parts throughout the several views and more particularly to FIG. 1 thereof, there is shown a typical commercial aircraft 1 with tricycle landing gear configuration consisting of a nose landing gear 3, port main landing gear 5, and starboard main landing gear 7. Attached to the hull of aircraft 1 is a typical inclinometer 6 which measure the angle, pitch and attitude changes of the aircraft hull. The inclinometer 6 can be located inside the hull of the aircraft.

Figure 2:
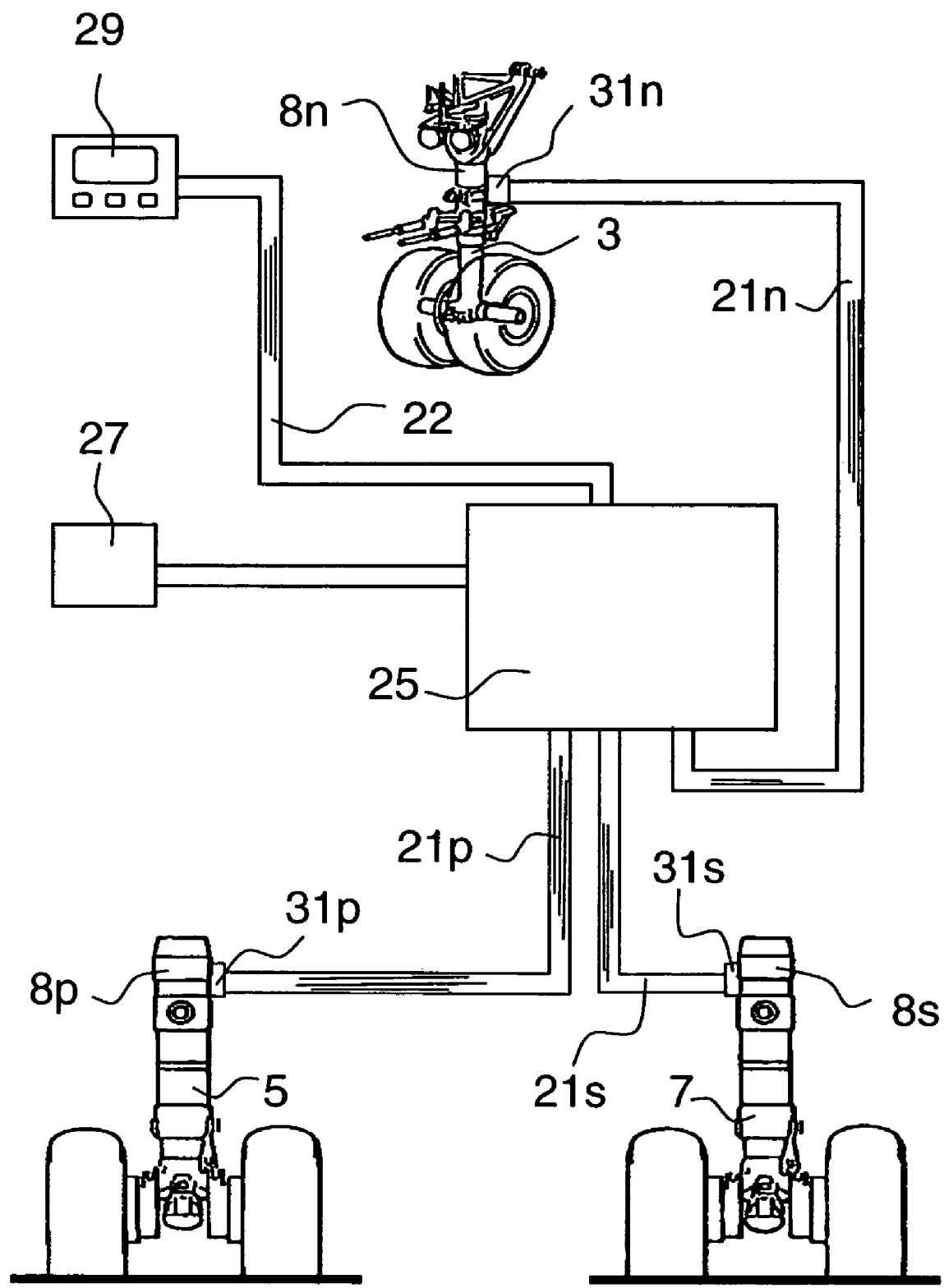
FIG. 2 is a schematic view of the invention in accordance with a preferred embodiment.

Referring now to FIG. 2, there is shown a schematic of the invention illustrating connecting components, in which n represents those components of the invention dedicated to the nose landing gear, p represents those components of the invention dedicated to the port landing gear, and s represents those components of the invention dedicated to the starboard landing gear. Nose landing gear 3, along with port main landing gear 5 and starboard main landing gear 7 support the weight of the airplane on a cushion of hydraulic fluid and compressed nitrogen gas. Internal strut pressure signals from each of the weight supporting struts are measured by pressure sensor assemblies 31*n*, 31*p*, 31*s* and transmitted via wiring harnesses 21*n*, 21*p*, 21*s* to an onboard computer/controller 25. The system is powered by an existing aircraft power source 27. Various calculations and information are transmitted via wiring harness 22 to an indicator/ auxiliary data storage device 29.

Figure 3:
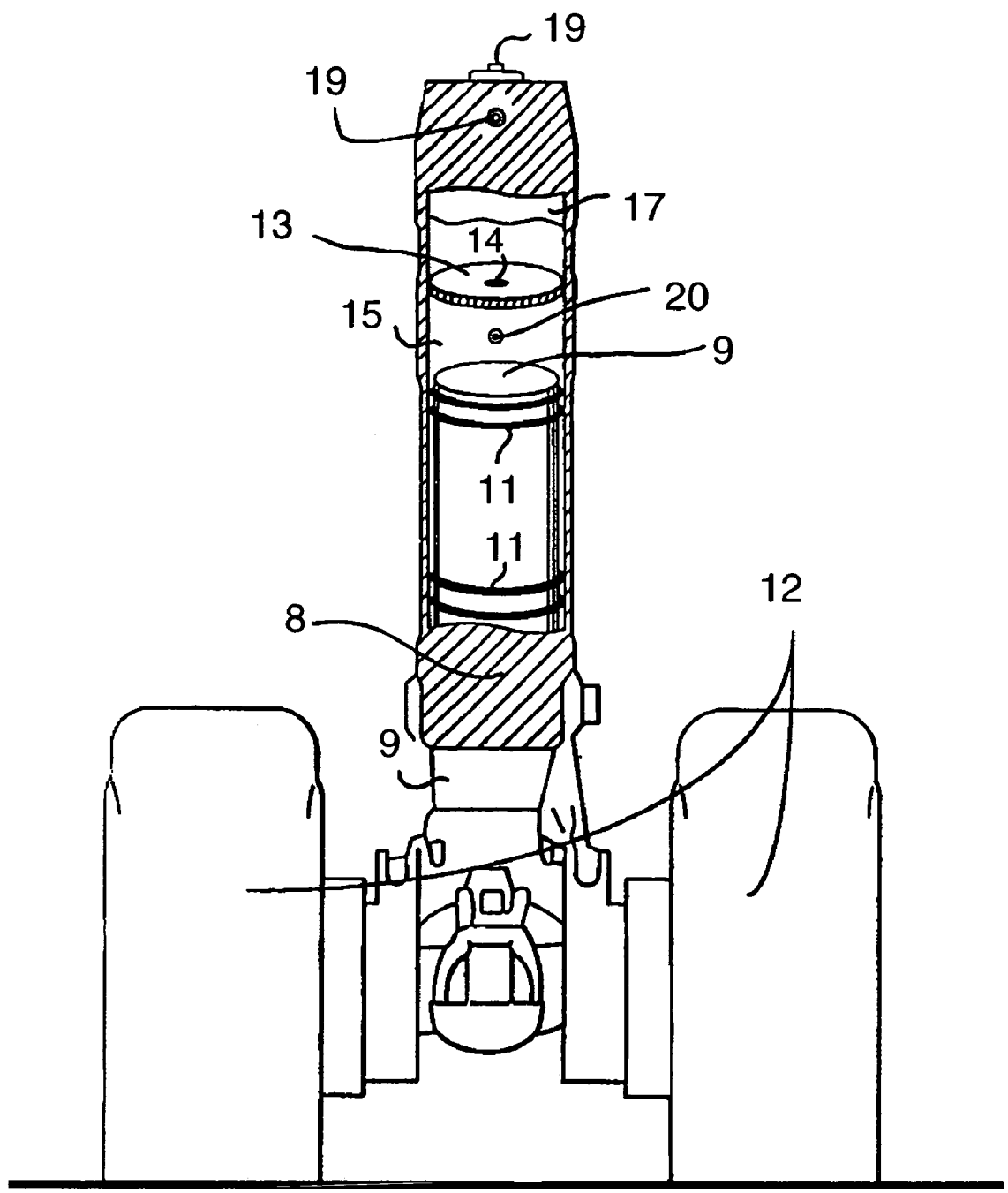
FIG. 3 is a partial cross-sectional front view of a typical commercial airliner landing gear strut, with enclosed piston, O-ring seals and orifice plate.

Referring now to FIG. 3, there is shown each conventional and commercially available landing gear 3, 5, 7 (FIG. 1) which consists of an oleo-type shock strut 8, hereafter referred to as "strut," of which together absorb the landing shock of the airplane on tires 12. Contained within strut 8 are fluids which include hydraulic liquid (referred to herein as hydraulic fluid 15) and nitrogen gas 17. Internally each strut contains a forged steel telescoping piston 9, with an orifice plate 13 containing an orifice hole 14, which dampens the strut compression motion. O-ring seals 11 serve to retain the hydraulic fluid 15 and compressed nitrogen gas 17 inside the strut cylinder. Strut 8 can be pressurized externally through a nitrogen gas access fitting 19. Hydraulic fluid can be accessed through fitting 20. Internal strut pressure measured at the initial point of landing will be higher at fitting 20, than that of fitting 19. At initial impact of aircraft landing, fluid 15 will pressurize to a level equivalent with landing loads. Fluid 15 will be forced through orifice hole 14, to dampen and absorb the landing impact loads, transmitted through the landing gear, up into the aircraft fuselage structure. Pressure measurements taken at fitting 19 will initially be lower than pressure measurements taken at fitting 20. After the aircraft comes to rest, these pressure measurements will equalize.

Figure 4:
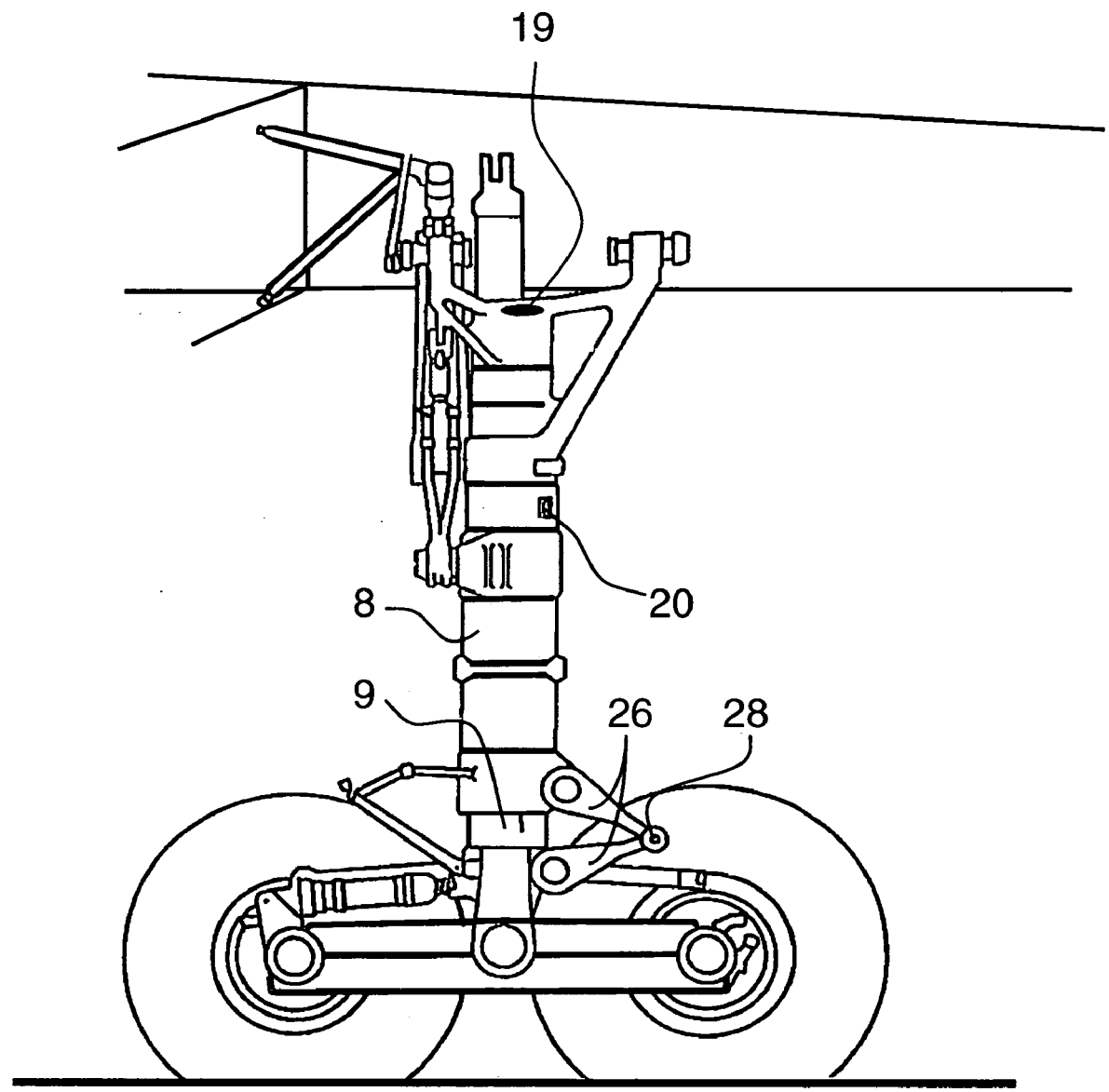
FIG. 4 is a side view of a typical commercial airline landing gear strut.

Referring now to FIG. 4, there is shown an alternate view of a typical commercial airliner strut 8 with telescoping piston 9. Fitting 19 is located at the top of strut 8. Internal strut pressure within strut 8 can be accessed through fitting 19. Fitting 20 is located lower on Strut 8. Fitting 20 is an alternate source of accessing strut pressure. Telescoping piston 9 is prevented from rotating within strut 8 by scissor link 26. A scissor link hinge 28 allows for the telescopic movement of piston 9, within strut 8.

Figure 5:
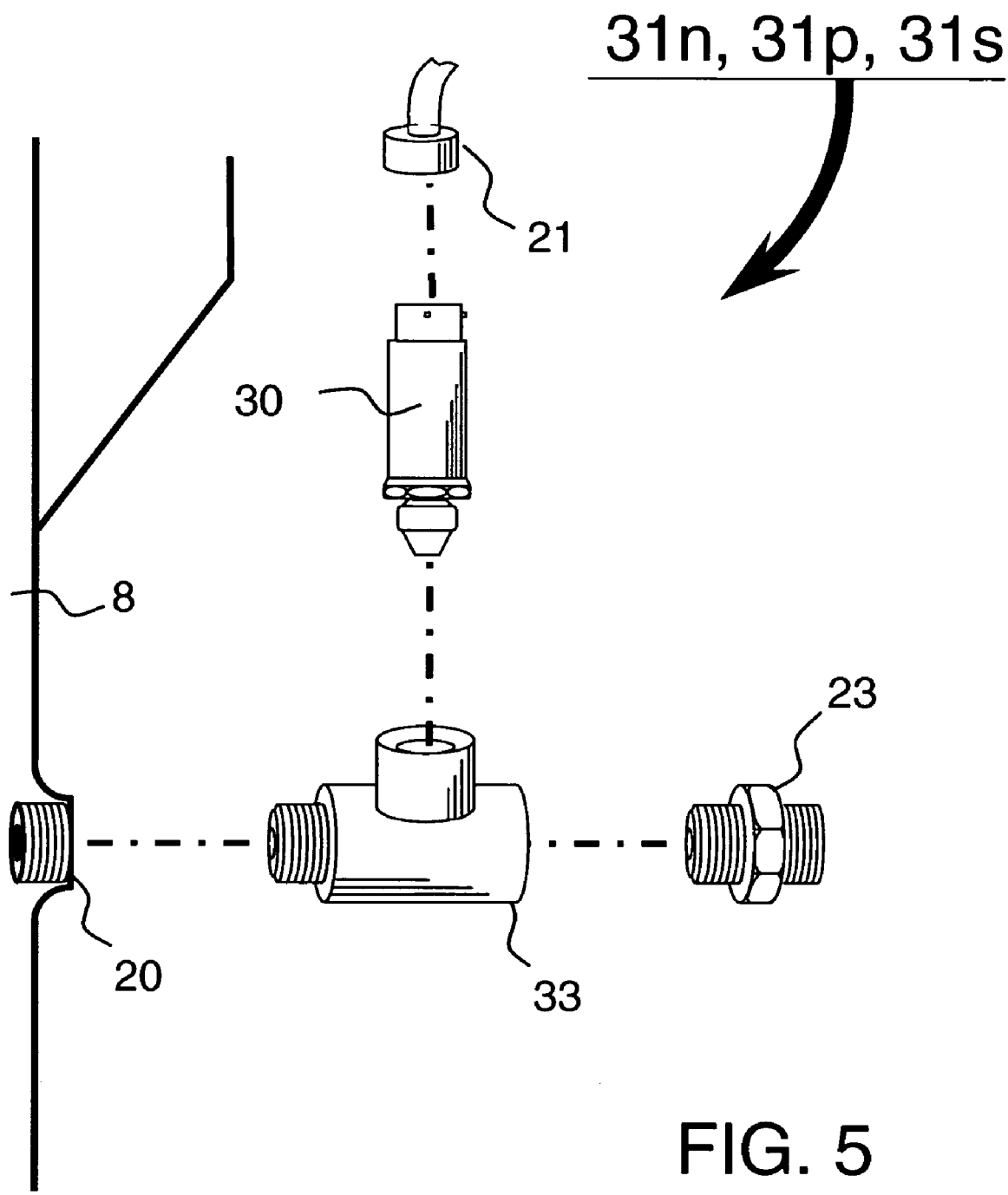
FIG. 5 is an exploded pictorial diagram of the strut pressure sensor assembly.

Referring now to FIG. 5, there is shown a detailed view of the embodiment of pressure sensor assemblies 31n, 31p, 31s, wherein strut 8 incorporates a pressurization valve 23 attached to each strut through the fitting 20. The pressurization valve 23 is removed to facilitate the installation of a T-fitting 33. A pressure sensor 30 is connected to T-fitting 33. The valve 23 is re-connected to the alternate port of T-fitting 33. Electronic signals relative to internal pressures measured within strut 8, are sent to the computer 25 (FIG. 2) via wiring harness 21.

Figure 6:
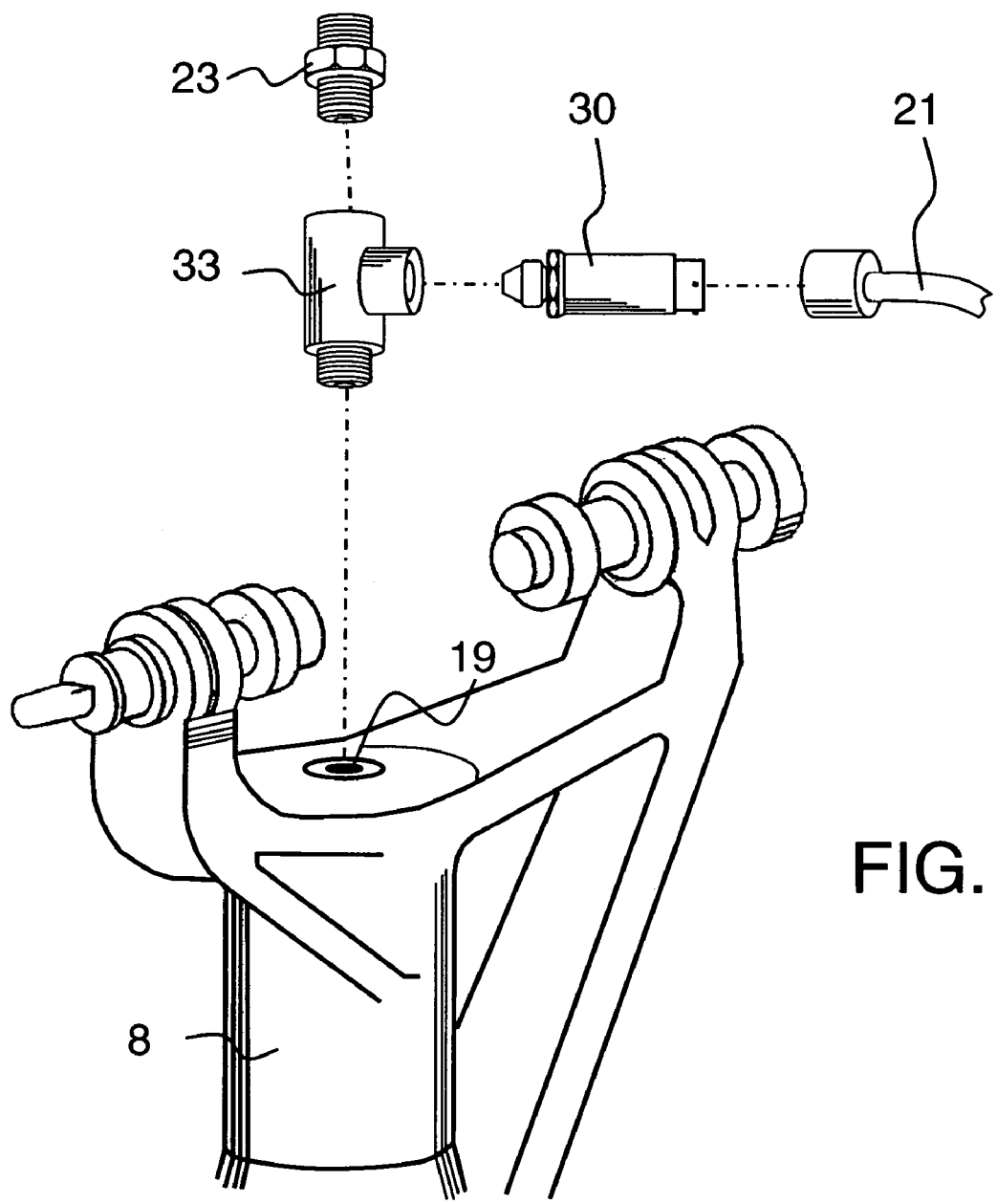
FIG. 6 is an exploded pictorial diagram of an alternate type of landing gear strut, with a strut pressure sensor assembly.

Referring now to FIG. 6, there is shown an alternate detailed view of the embodiment of pressure sensor assemblies 31n, 31p, 31s, wherein an alternate view showing the top of strut 8 which incorporates a top pressurization valve 23 attached to each strut through fitting 19. In some cases strut 8 is limited to this single port (in this case fitting 19) to access strut pressure. (Such a strut lacks fitting 20 (see FIG. 4)). The pressurization valve 23 is removed to facilitate the installation of a T-fitting 33. A pressure sensor 30 is connected to T-fitting 33. Pressure signals relative to internal pressure measured within strut 8 are sent to the computer 25 (FIG. 2) via wiring harness 21. Pressure measurements taken from this "low pressure" side of the piston orifice are corrected by software program 36—Strut Pressure Monitoring (described in FIG. 10).

Figure 7:
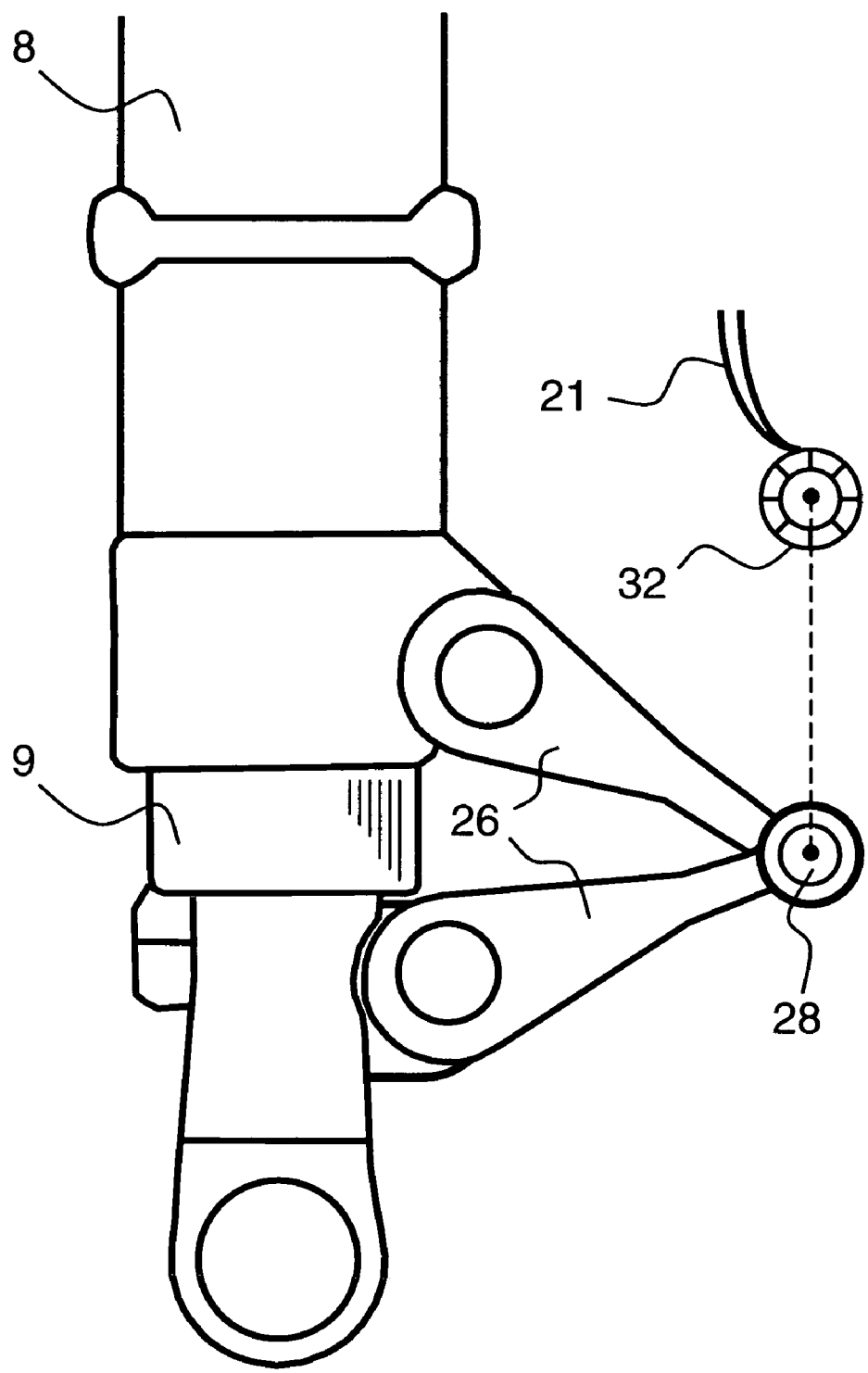
FIG. 7 is a side view of a typical aircraft landing gear strut scissor-link with attached components of the invention

Referring now to FIG. 7, there is shown the lower portion of each landing gear consisting of one oleo-type shock strut 8 and a forged steel telescoping piston 9. Piston 9 is restricted from rotating within the outer cylinder of strut 8 by a strut scissor-link 26. Strut scissor-link 26 incorporates a hinge pin 28. A Radial Variable Digital Transducer, hereafter referred to as a RVDT 32, is attached to strut scissor-link 26 at hinge pin 28 in a manner which allows the RVDT 32 to measure the movement of each of the arms of scissor-link 26 in relation to hinge pin 28. The measurement of the strut scissor-link movement is a method of mechanically determining and measuring strut extension and strut collapse. The telescoping distance the piston 9 moves in relation to strut 8 is measured by the RVDT 32. Furthermore, the RVDT 32 measures the piston movement over time. Other sensors and arrangements, such as an inclinometer mounted on one of the links of the scissor-link 26, can be used to measure the piston movement. Strut extension measurement signals from RVDT 32 are sent to computer 25 (FIG. 2) via wiring harness 21.

Figure 8:
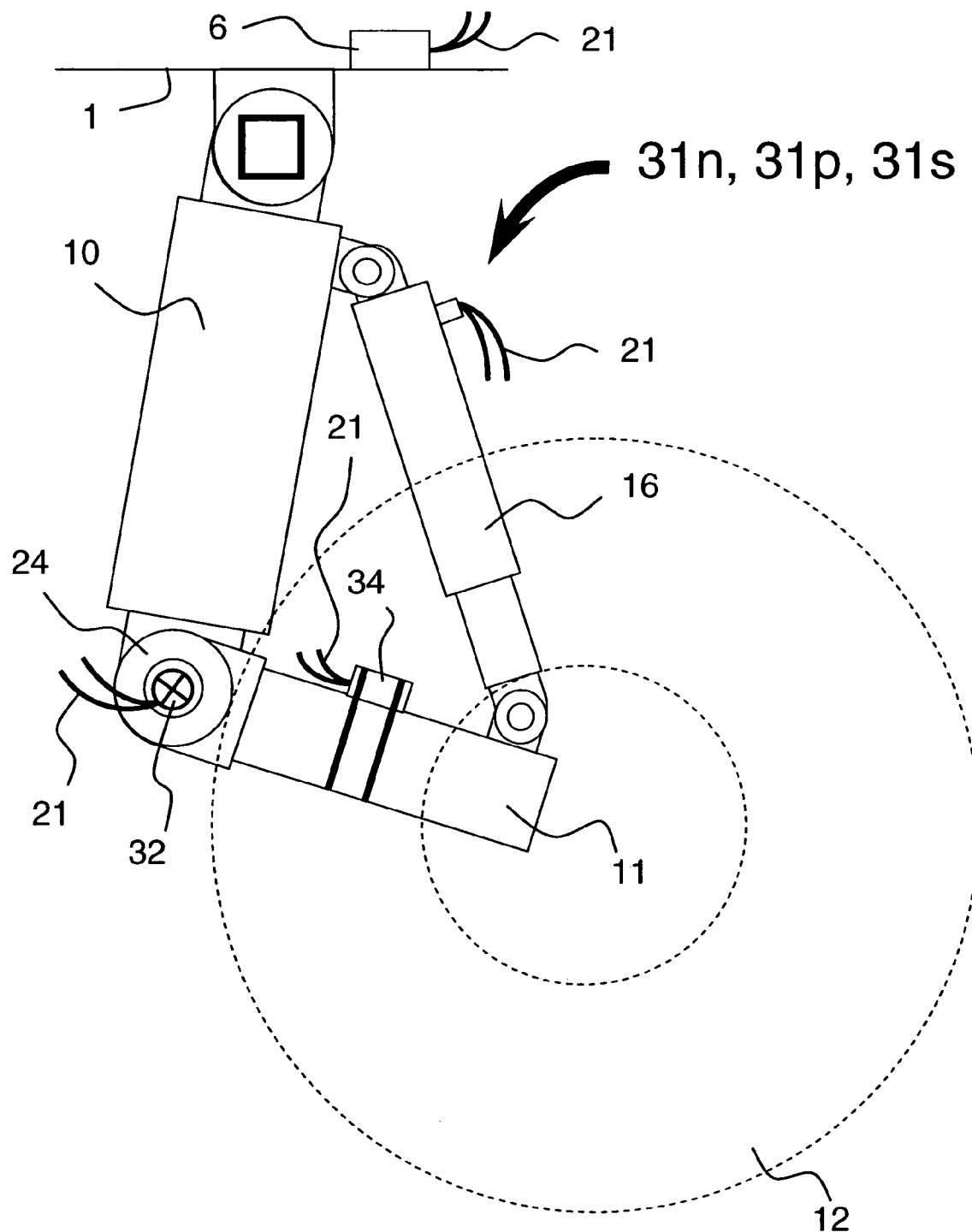
FIG. 8 is a side view of a trailing arm type of landing gear strut, with attached components of the invention.

Referring now to FIG. 8, there is shown a different configuration of a typical landing gear referred to here as alternate strut 10, which is commonly used on smaller regional type aircraft. Alternate strut 10 is designed with a trailing arm 11. In this configuration the loads experienced at aircraft landing are transferred to the internal pressure within shock absorber 16. Internal pressure measurements, in relation to loads experienced during aircraft landing are measure by pressure sensor assemblies 31n, 31p, 31s. Electronic signals relative to internal pressures within shock absorber 16, are sent to the computer 25 (FIG. 2) via wiring harness 21. Computer 25 also receives varying landing gear position information via wiring harness 21 from strut trailing arm mounted inclinometer 34 or RVDT 32 which is mounted on trailing arm hinge 24. The strut 10 and trailing arm 11, as connected across the cylinder-piston of the shock absorber 16, function as a scissor-link. Piston movement is measured by the inclinometer 34 or the RVDT 32. Inclinometer 6 is attached to the aircraft 1 to monitor and measure the changing hull angle and during the landing event. That data is transmitted to computer 25 via wiring harness 21.

Figure 9:
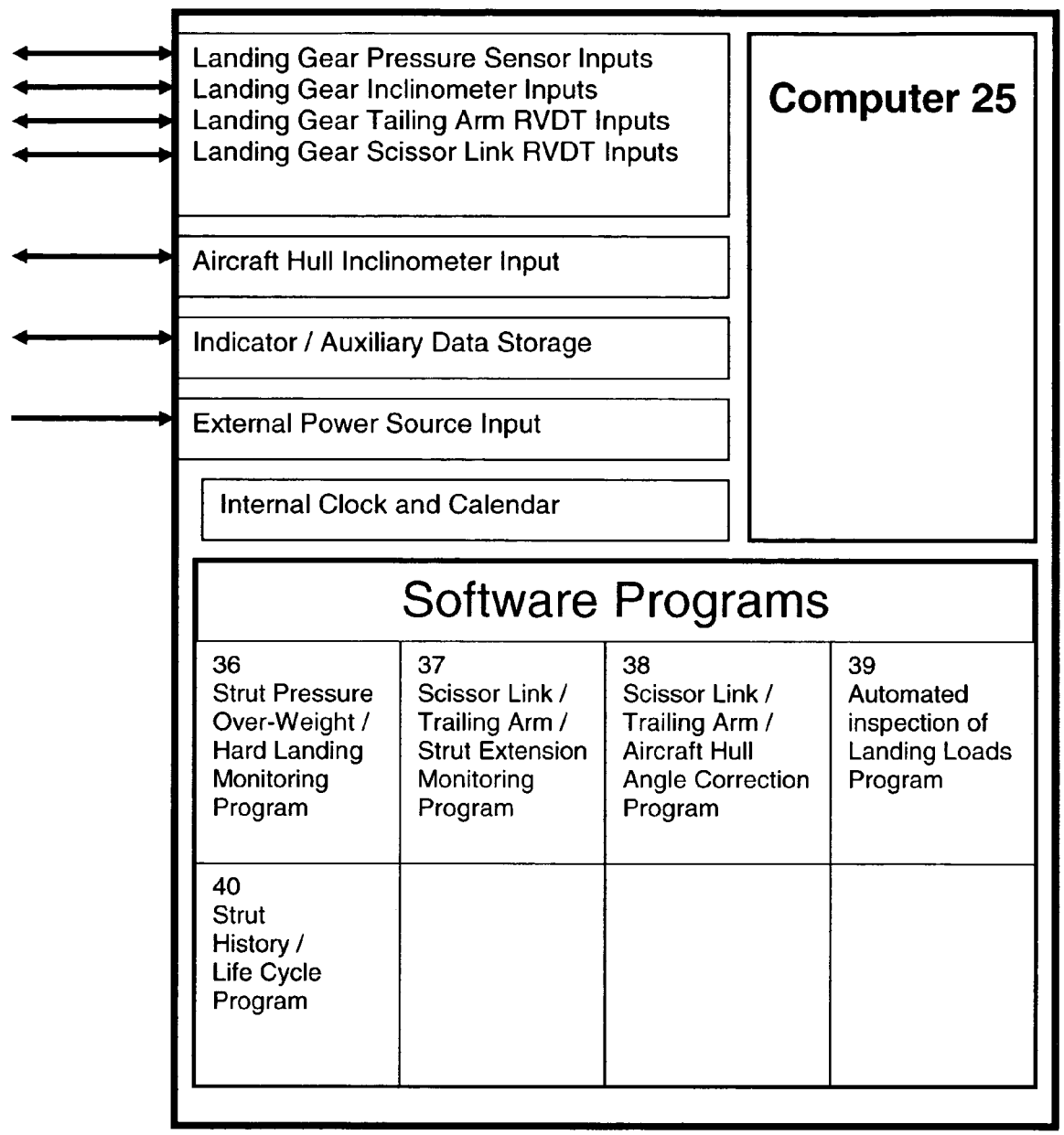
FIG. 9 is a schematic diagram of the onboard computer, of the invention.
Figure 10A:
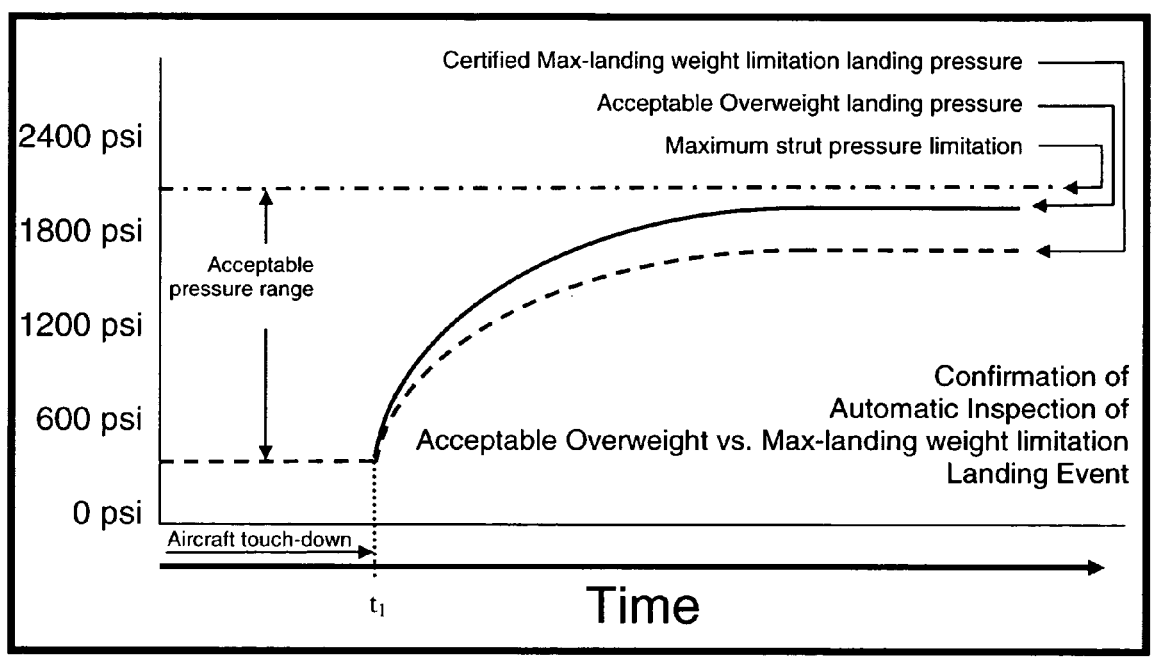
FIGS. 10A and 10B are illustrations of Software Program 36 which monitors strut pressure, in relation to elapsed time, during aircraft landing events.
Figure 10B:
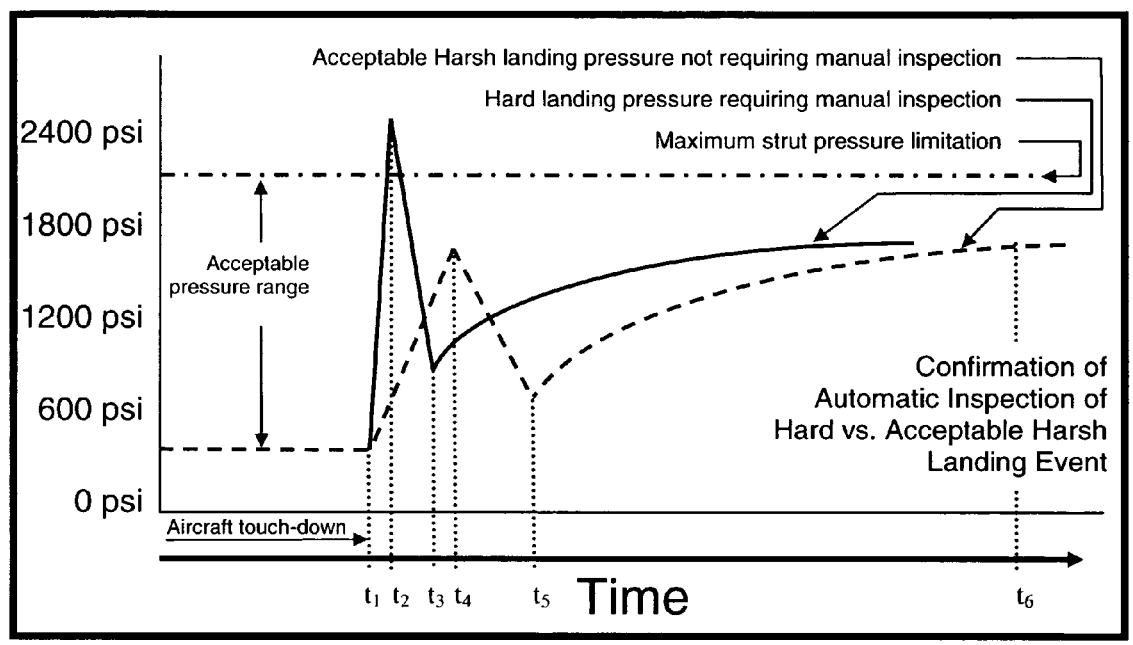
Figure 11:
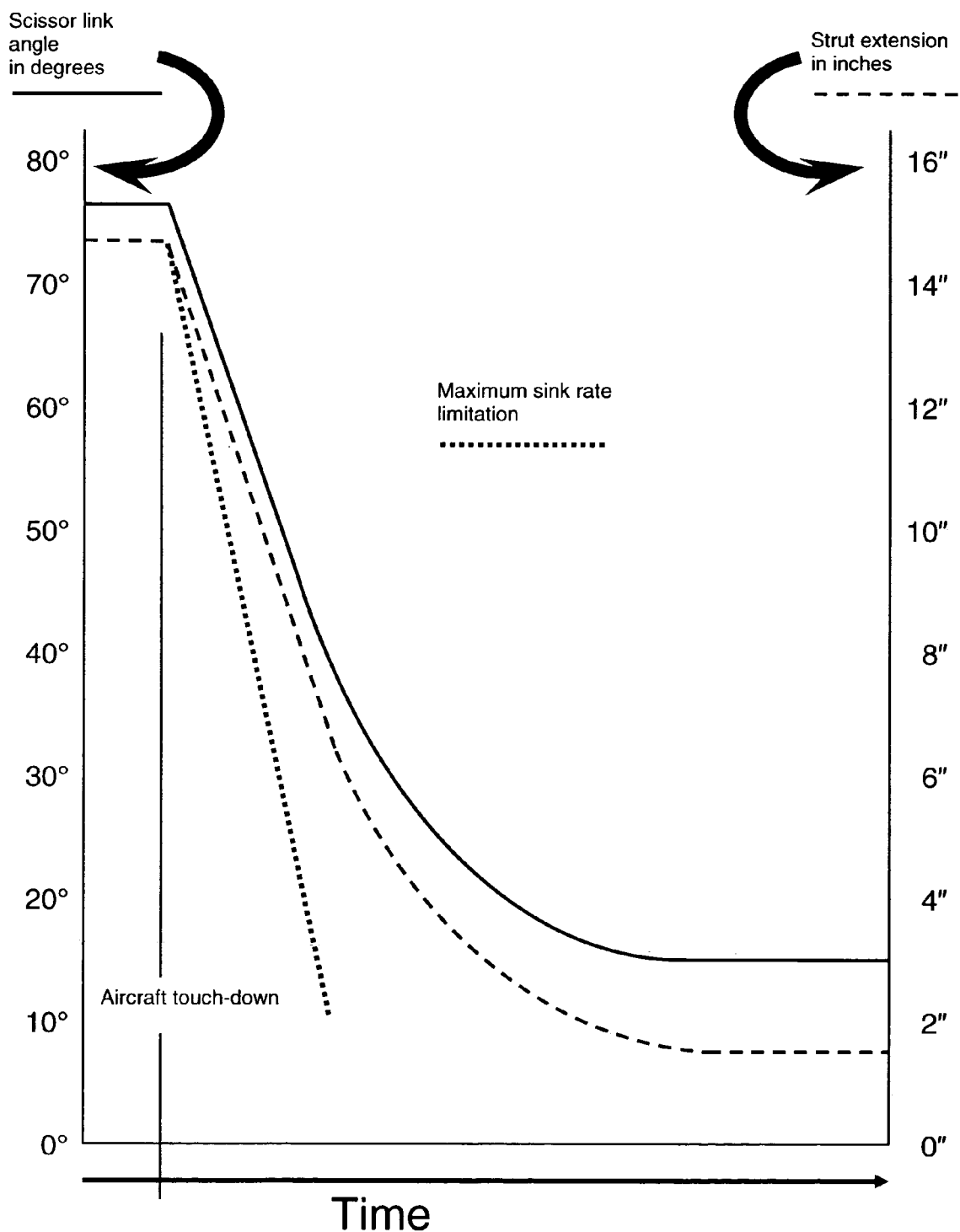
FIG. 11 is an illustration of Software Program 37 which compares strut extension to scissor/trailing link angle, in relation to elapsed time, during aircraft landing events.
Figure 12:
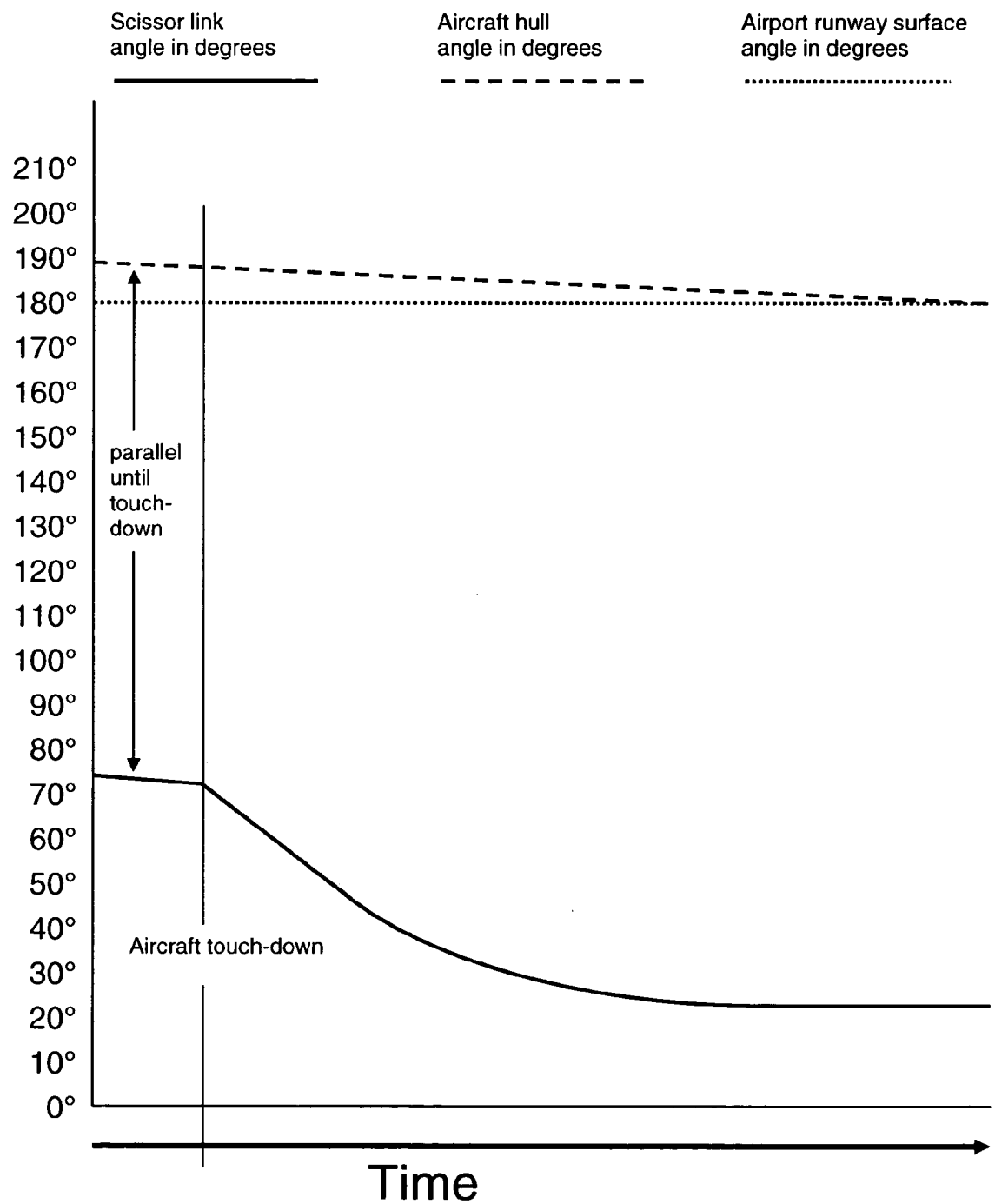
FIG. 12 is an illustration on Software Program 38 which compares aircraft hull inclination to scissor/trailing link angle, in relation to elapsed time, during aircraft landing events.

Referring now to FIG. 9, there is shown the computer 25, wherein the various Software Programs 36, 37, 38, 39, and 40 of this invention are illustrated, and will be further describe in FIGS. 10, 11 and 12. Computer 25 incorporates an internal calendar and clock, which monitors various data inputs, in relation to elapsed time, as well as store the data to be reference by dates and time. Landing gear strut internal pressure signals, are received via wiring harnesses from the pressure sensors 31n, 31p, 31s (FIG. 2). Computer 25 also receives varying landing gear extension measurement information via wiring harnesses from strut trailing arm mounted inclinometer 34 (FIG. 8), strut scissor link mounted RVDT 32 (FIG. 7), or strut trailing arm hinge mounted RVDT 32 (FIG. 8). Computer 25 also receives aircraft inclination information from an aircraft hull inclinometer 6 (FIG. 1). Computer 25 is powered by an external input, and also transmits data to an indicator (such as cockpit, light, display, printer, etc.) and/or auxiliary data storage device (such as a hard drive disk).

The present invention monitors the landing gear during a landing event and records information about the landing gear during the landing event. One technique to monitor the landing gear is to measure and record the strut pressure (FIG. 10). Another technique is to measure and record the movement of the strut and the rate of movement (the sink rate) (FIG. 11). Combining pressure measurements and sink rate measurements provides accurate information on land gear stresses experienced during the landing event. Pressure measurements can be corrected or compensated if needed. For example, pressure sensor location can be compensated for. If need be, strut temperature and strut friction can also be compensated for. Sink rate measurements can also be corrected or compensated if needed (see FIG. 12). The measured pressure and/or sink rate information is compared to maximums and if the maximums are exceeded, indications are given. If the maximums are not exceeded, indications or reports can also be given to show no damage to the struts and no need for a manual inspection, wherein the aircraft can continue operations.

Referring now to FIGS. 10A and 10B, there are shown illustrations of Software Program 36—Strut Pressure Monitoring and Automated Hard/Over-Weight Landing Identification, which measures and records strut pressure changes during landing events, in relation to elapsed time. Maximum strut pressure limitations, provided by the manufacturer, are stored within Software Program 36. These limitations are compared against the internal strut pressures experienced in actual landing events, whether the landing might be considered a hard landing, a harsh but acceptable, or an overweight landing, to determine if strut maximum strut pressure limitations have been exceeded. Additionally aircraft manufacturers set recommended limitations to the aircraft's maximum landing weight. Aircraft sometimes land at weights higher than the manufacturer's certified limitations. These overweight landing events are allowed but the aircraft manufacturer requires the aircraft operators to perform a manual inspection to determine if the over-weight landing loads or a hard landing event, caused damage to the aircraft. Strut pressure measurements are recorded by the pressure sensor assembly 30 which is typically located at strut fitting 20 (FIGS. 3 and 5), below orifice hole 14 (FIG. 3), and contained in the high pressure area of the strut. Strut pressure measurements taken from this high pressure area are in direct relation to the amount of landing load experienced during the aircraft landing event. Software Program 36 also provides for error corrections in strut pressure measurement data. Strut pressure error correction is required for strut pressure measurements recorded at strut fitting 19 (FIGS. 3 and 5) which is located above orifice hole 14 (FIG. 3), and located in the low pressure area of the strut. This error correction is required because these measurements are not in direct relation to the amount of landing load experienced during the aircraft landing event. The measured pressure data is compensated by determining the increase in pressure at this low pressure area, as it relates to the elapsed time for the pressure change. The sizing and dimension of orifice hole 14 (FIG. 3) restricts the amount of hydraulic fluid 15 (FIG. 3) which can pass through the orifice hole. The greater the pressure becomes on the high pressure side of the orifice hole, the faster the fluid passes through the hole to the low pressure side of the strut. Measuring these pressure increases, related to the rate of the pressure increases in relation to elapsed time, on the low pressure side of the orifice, allows Software Program 36 to calculate the amount of pressure sustained on the high pressure side of the orifice. This corrected strut pressure data is used to determine the amount of landing load experienced during the aircraft landing event.

The present invention is useful in allowing an aircraft operator to land at or even over the certified maximum landing weight of the aircraft. At the departure location, an operator oversees the loading of payload (passengers, baggage, cargo, etc.) and fuel onto the aircraft. The operator knows the empty weight of the aircraft, knows the weight of fuel onboard and uses guidelines to estimate the cargo weight or knows the cargo weight. The operator knows the weight of fuel that is typically burned by the aircraft from the departure location to an arrival location. Based on this information, the operator determines the planned landing weight of the aircraft. With the present invention, the operator can land the aircraft in excess of the planned landing weight. This allows the loading or one or more additional passengers and/or fuel. This also allows the landing of the aircraft if less than all of the planned fuel has been consumed, such as when the aircraft has a tail wind, or a storm fuel reserve has not been consumed. The operator relies on the invention to determine if the landing gear is overly stressed on landing. If the landing gear has not been overly stressed, then the aircraft can be operated after the immediate landing event, without the need for a manual inspection of the landing gear.

In FIG. 10A, the actual measured strut pressure during a landing event is shown by a solid line. The strut pressure is relatively low and constant before aircraft touchdown. The landing gears are hanging from the aircraft and bear no aircraft weight. Upon touchdown, the strut pressure increases and then remains constant. After touchdown, the constant strut pressure shows that the aircraft has slowed significantly so that the wings generate no lift and all of the aircraft weight is born by the landing gear. In FIG. 10A, the aircraft is considered overweight because the landing weight exceeds the aircraft manufacturer's certified maximum landing weight (shown by a dashed line). The present invention provides an automatic inspection of the landing gear. Even though the aircraft was considered overweight, at no time did strut pressure exceed the maximum strut pressure limitation. Therefore, no manual inspection is needed. A report is generated to certify the automated inspection for each strut.

In FIG. 10B, time reference points include: $t_1$ representing the point when the landing gear comes in contact with the ground, $t_2$ representing the point when the maximum pressure is measured during a hard landing event, $t_3$ representing the point when the recoil or bounce of the aircraft, during a hard landing event, reduces strut pressure to a lower pressure, $t_4$ representing the point when the maximum pressure is measured during a harsh but acceptable landing event, $t_5$ representing the point when the recoil of bounce of the aircraft, during a harsh but acceptable landing event drops to a lower pressure, $t_6$ representing the point when the aircraft wings are no longer generating lift and the entire weight of the aircraft rests on the landing gear. The solid line shows an unacceptable hard landing because strut pressure exceeded the maximum strut pressure limitation. An indication of a hard landing is provided (such as a warning light in the cockpit) and the aircraft is removed from service for a manual inspection. Such a hard landing might occur for example if the landing was asymmetric, where one landing gear strut absorbed more of the load than the others. The dashed line shows an acceptable hard landing; at no time did strut pressure exceed the maximum strut pressure limitation. Therefore, no manual inspection is needed. A report is generated to certify the automated inspection for each strut.

The strut pressure measurements are used in combination with other software programs within computer 25 to develop a landing gear strut component actual usage fatigue life curve.

Referring now to FIG. 11, there is shown an illustration of Software Program 37, Inclinometer/RVDT Comparison of Landing Gear Scissor Link to Landing Gear Strut Extension during landing event, which compares the measured angle (in this case, in degrees) of the landing gear strut scissor link 26 (FIG. 7), to the amount (in this case, in inches) of telescopic extension in the landing gear strut, in relation to elapsed time. Scissor link 26 is merely a hinge to allow the telescopic extension of the landing gear strut. Trailing arm 11 (FIG. 8) can also be considered a similar form of hinge, to allow extension of shock absorber 16 (FIG. 8). As the strut telescopes, the inclination of the linkage 11 is measured by the inclinometer 34 (FIG. 8) or the angle between the linkage 26 is measured by the RVDT 32 (FIG. 7). FIG. 11 illustrates the strut movement during a landing event. In FIG. 11, the strut telescopes by compressing. There is no "bounce" as might be seen in a hand landing, indicating a smooth landing (see FIG. 10A). The strut compresses from about 15 inches, just before touchdown, to about 2 inches, when the wings no longer generate lift and the full weight of the aircraft is born by the landing gear. The comparison of strut compression in relation to elapsed time determines the sink rate experienced during a landing event. The measured sink rate, or rate of movement of the strut, is then compared to the maximum sink rate limitation. As illustrated in FIG. 11, the sink rate of the actual landing event (shown by the slope of the solid line) is less than the maximum sink rate limitation (shown by the slope of the dotted line). Consideration of the speed and duration of internal strut pressure increases obtained through the description of FIG. 10 and determination if max-pressure limitations have been exceeded, as compared to the aircraft sink rate measurements, will identify if the aircraft has experienced a hard landing event.

Referring now to FIG. 12, there is shown an illustration of Software Program 38—Inclinometer Comparison of Aircraft Hull to Landing Gear Scissor Link to Level Airport Runway, during landing event. This Software program 38 compensates the landing gear inclinometer with the change in hull inclination. Inclinometers monitor the angle of the landing gear strut scissor link as the landing gear comes into contact with the airport's level (constant 180°) runway. When the landing gear absorbs the landing loads telescopic piston 9 (FIG. 3) retracts into the strut 8. The retraction of piston 9 causes the angle of scissor link 26 (FIG. 7) to change in relation to the aircraft hull. During the landing event the angle of the aircraft hull will also change. Software program 38 monitors and compares the angle changes of both the scissor link and aircraft hull inclinometers, and corrects scissor link angle errors due to changes in angle of the aircraft hull, during the landing event. The compensation provided by software program 38 need not be used if the strut movement is measured by an RVDT 32.

Software Program 39—Automated Landing Load Inspection Program compares data compiled in the automated strut pressure monitoring program 36 (illustrated in FIG. 10.) with the data compiled in the automated determination of aircraft sink rate program 37 (illustrated in FIG. 11.), to determine in landing load limitations have been exceeded. The findings of this comparison will provide for the accomplishment of an automated aircraft landing load inspection, and further determine if either an allowable over-weight landing event has occurred, which did not exceed manufacture's limitations and does not require an additional manual inspection of aircraft components and structures; or hard landing event has occurred, which exceeds manufacture's limitations, and does require a manual inspection of aircraft components and structures.

Software Program 40—Landing Gear Strut History identifies, monitors, records and compares all aircraft landing load event data; to develop a landing gear "Actual Usage" fatigue life curve. The process will include recording aircraft landing load data to be subsequently used by aircraft manufacturers in allowing for escalation in aircraft landing gear life limitations. Parameters associated, but not limited to the landing life cycle escalations include:

a. Storing the aircraft manufacturer's landing gear life limitations regarding component fatigue life considering:

i. Predicted number of maximum landing loads experienced.

ii. Predicted number of excessive sink rate events experienced.

iii. Actual number of landing cycles allowed by manufacturer, considering anticipated usage.

b. Measuring, recording and storing of the actual aircraft landing gear load data, including hard landing events, throughout the now "measured" life of the landing gear strut.

c. Comparison of aircraft manufacture's "predicted" landing load events, as to aircraft's actual "measured" landing load events; related to an equal and parallel number of landing cycles.

Although the present invention has been described as applying to telescopic, fluid type of landing gear struts, the invention could also apply to other types of landing gear, such as a scissors-link gear.

Although an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

What is claimed is:

1. A method of monitoring a landing gear strut of an aircraft during a landing event, the landing gear strut being telescopic and comprising a compressible fluid, comprising the steps of:
   a) determining the telescopic rate of movement of the strut during the landing event;
   b) determining if the strut has exceeded a predetermined strut rate of movement;
   c) if the strut has exceeded the predetermined strut rate of movement, then providing an indication thereof.

2. The method of claim 1 wherein the step of determining the telescopic rate of movement of the strut during the landing event further comprises the step of measuring an inclination of a linkage on the strut.

3. The method of claim 2 wherein the step of determining the telescopic rate of movement of the strut during the landing event further comprises the step of compensating the inclination of the strut linkage for changes in the aircraft inclination.

4. The method of claim 1 wherein the step of determining the telescopic rate of movement of the strut during the landing event further comprising the step of measuring an angle of a linkage on the strut.

5. The method of claim 1 further comprising the steps of:
   a) determining the fluid pressure of the strut during the landing event;
   b) determining if the strut has exceeded a predetermined fluid pressure;
   c) if the strut has exceeded the predetermined fluid pressure and if the strut has exceeded the predetermined strut rate of movement, then providing an indication thereof.

6. The method of claim 5 further comprising the steps of wherein if the strut has not exceeded the predetermined fluid pressure and if the strut has not exceeded the predetermined strut rate of movement, but the aircraft has exceeded a maximum landing weight, then continuing to operate the aircraft without manual inspection of the aircraft after the immediate landing event.

7. The method of claim 1 further comprising the step of wherein if the strut has not exceeded the predetermined strut rate of movement, but the aircraft has exceeded a maximum landing weight, then continuing to operate the aircraft without manual inspection of the aircraft after the immediate landing event.

8. A method of monitoring a landing gear strut of an aircraft during a landing event, the landing gear strut being telescopic and comprising a compressible fluid, the strut having a maximum fluid pressure limit and acceptable fluid pressure range, the acceptable fluid pressure range being lower than the maximum fluid pressure limit, comprising the steps of:
   a) determining the fluid pressure of the strut throughout the landing event;
   b) determining if the strut fluid pressure, after the point the aircraft wings are no longer generating lift, has exceeded the maximum fluid pressure limit;
   c) if the determined strut fluid pressure has exceeded the maximum fluid pressure limit, then providing an indication thereof.

9. The method of claim 8 further comprising the step of wherein if the determined strut fluid pressure has not exceeded the maximum fluid pressure limit, but the aircraft has exceeded a maximum landing weight then continuing to operate the aircraft without manual inspection of the aircraft after the immediate landing event.

10. The method of claim 8 wherein the step of determining the fluid pressure of the strut during the landing event further comprises the step of measuring strut pressure in a high pressure location of the strut.

11. The method of claim 8 wherein the step of determining the fluid pressure of the strut during the landing event further comprises the step of measuring strut pressure in a low pressure location of the strut and compensating for error due to the low pressure location.

12. A method of operating an aircraft from a departure location to an arrival location, the aircraft having telescopic landing gear struts that comprise a compressible fluid, each of the struts having a maximum fluid pressure limit, the aircraft having a takeoff weight and a planned landing weight, the planned landing weight being less than the takeoff weight by a weight of the fuel consumed by the aircraft during the flight, the aircraft having a certified maximum landing weight, comprising the steps of:
   a) at the departure location loading the aircraft with payload and fuel, the fuel being a planned fuel which will be consumed on the flight from the departure location to the arrival location, the planned landing weight being equal to or less than the certified maximum landing weight;
   b) landing the aircraft with some of the planned fuel remaining onboard;
   c) upon landing the aircraft, measuring strut load;
   d) for each strut, determining if the strut load on landing has exceeded the maximum strut load limit;
   e) if for each strut, the strut load has not exceeded the maximum strut load limit, then continuing to operate the aircraft without manual inspection of the aircraft, after the immediate landing event.

13. The method of claim 12 wherein after a landing event of the aircraft, further comprising the steps of:
   a) the step of measuring strut load further comprises the step of determining the telescopic rate of movement of the strut during the landing event;
   b) the step of determining if the strut load on landing has exceeded the maximum strut load limit further comprising the step of determining if the strut has exceeded a predetermined strut rate of movement limitation;
   c) if the strut has exceeded the predetermined strut rate of movement, then providing an indication thereof.

14. The method of claim 12 wherein after a landing event of the aircraft, further comprising the steps of:
   a) the step of measuring strut load further comprises the step of determining the fluid pressure of the strut during the landing event;
   b) the step of determining if the strut load on landing has exceeded the maximum strut load limit further comprising the step of determining if the strut fluid pressure has exceeded a maximum fluid pressure limit;
   c) if the strut fluid pressure has exceeded the maximum fluid pressure limit, then providing an indication thereof.

15. A method of determining life limitations of a landing gear strut on an aircraft, the strut being telescopic and having a compressible fluid therein, comprising the steps of:
   a) recording strut fluid pressures during landing events of the aircraft;
   b) recording strut sink rates during landing events of the aircraft;
   c) comparing the recorded fluid pressures to a predicted maximum landing loads of the strut and comparing the recorded sink rates to a predicted excessive sink rate of the strut;
   d) using the comparison, determining the remaining useable life of the landing gear strut.

* * * * *